United States Patent Office 3,420,818
Patented Jan. 7, 1969

3,420,818
TETRAHYDROISOQUINOLINES
Hans Ott, Convent Station, N.J., assignor to
Sandoz, Inc., Hanover, N.J.
No Drawing. Continuation-in-part of application Ser. No.
391,732, Aug. 24, 1964. This application Feb. 20, 1967,
Ser. No. 617,051
U.S. Cl. 260—239.3       36 Claims
Int. Cl. C07d 53/06

ABSTRACT OF THE DISCLOSURE

The compounds are of the class of 5,9,10,14b-tetrahydroisoquino[2,1-d][1,4]benzodiazepin-6(7H)-one, useful as oral or parenteral anticonvulsants, sedatives and muscle relaxants.

---

This application is a continuation-in-part of application Ser. No. 391,732 filed Aug. 24, 1964, application Ser. No. 447,522 filed Apr. 12, 1965, application Ser. No. 477,975 filed Aug. 6, 1965, and application Ser. No. 477,976 filed Aug. 6, 1965 now all abandoned.

The invention provides pharmaceutically acceptable tetrahydroisoquinobenzodiazepinones of the formula

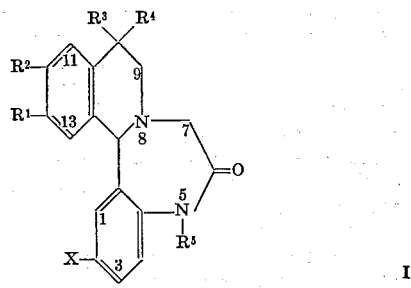

I wherein
each of $R^1$ and $R^2$ is either, independently, a hydrogen atom (—H); chloro (—Cl); bromo (—Br); lower alkyl, e.g. methyl, ethyl, propyl and butyl; lower alkoxy, e.g. methoxy, ethoxy, propoxy and butoxy; or, taken together, methylenedioxy (—O—CH$_2$—O—);
each of $R^3$ and $R^4$ is either a hydrogen atom (—H) or lower alkyl, e.g. methyl, ethyl, propyl and butyl;
$R^5$ is either a hydrogen atom (—H); lower alkyl, e.g. methyl, ethyl, propyl, isopropyl and butyl, preferably having from 1 to 4 carbon atoms; allyl; or propargyl; and
X is either a hydrogen atom (—H); halo (preferably —Cl or —Br); nitro (—NO$_2$); amino (—NH$_2$) or trifluoromethyl (—CF$_3$);
and $N_8$-oxides thereof. [For the $N_8$-oxides $R^1$ and $R^2$ are, preferably, either a hydrogen atom, lower alkoxy or, taken together, methylenedioxy; $R^5$ is either hydrogen or lower alkyl; and X is, preferably, a hydrogen atom, chloro, bromo, nitro or trifluoromethyl.]

The key intermediates (compounds II) in the synthesis of Compound I,

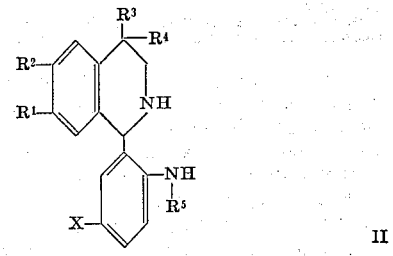

II wherein
each of $R^1$, $R^2$, $R^3$, $R^4$, $R^5$ and X has its above-ascribed meaning, as it does throughout the instant text unless otherwise specified,
are also within the scope of the present invention.

Intermediates II are prepared according to a number of different reaction schemes either from known starting materials or from starting materials which are readily prepared by the art-skilled according to known procedures and from known materials. Exemplary reaction schemes are:

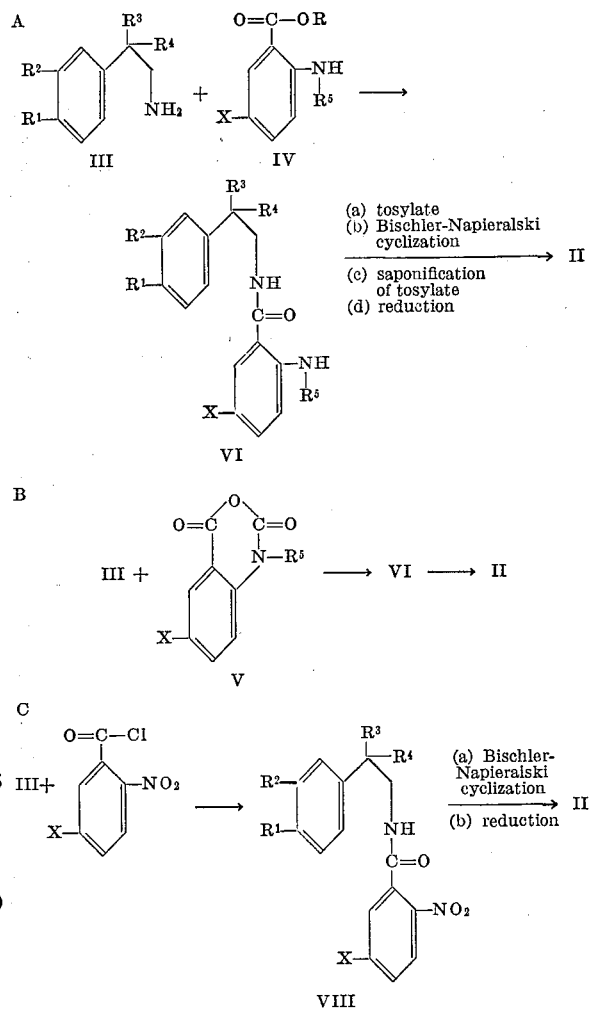

wherein R is either methyl or ethyl. (See Compounds IV and IX.)

Compounds I are prepared from the corresponding intermediates II according to either of the following reaction schemes:

D

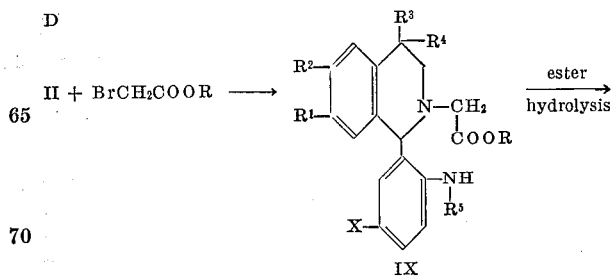

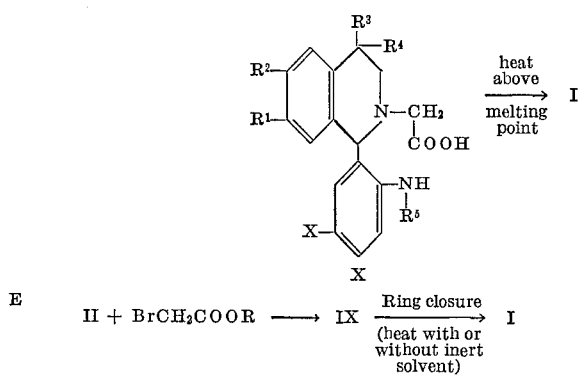

E     II + BrCH₂COOR ⟶ IX $\xrightarrow[\text{without inert solvent)}]{\text{Ring closure (heat with or}}$ I Reaction A comprises heating an admixture of equimolar amounts of Compounds III and IV at temperatures up to from 150° to 200° C. (preferably in vacuo) or by refluxing the admixture in an inert organic solvent, such as dioxane, toluene or xylene, to obtain Compound VI. Reaction B starts rapidly at room temperature (20° C.) on admixture of Compounds III and V in an inert solvent, such as tetrahydrofurane, dioxane, dimethylformamide and dimethylsulfoxide, with evolution of carbon dioxide; completion of the first step is effected by heating for fifteen minutes on a water bath; Compound VI is thereafter precipitated in essentially quantitative yield on addition of water to the obtained solution.

The first step of reaction C is conducted in aqueous alkali, e.g. sodium hydroxide, (Schotten-Baumann conditions), preferably in admixture with a water-miscible solvent, e.g. tetrahydrofurane and dioxane.

To protect the amino group of intermediate VI during the Bischler-Napieralski ring closure, the use of said intermediate in the form of its tosylate is satisfactory, but other protecting groups, such as acetyl, benzoyl and mesyl, are alternatively employed. The preparation of the tosylate is carried out in the usual well-known manner either under Schotten-Baumann conditions or in pyridine.

Ring-closure of the tosylate to the corresponding 3,4-dihydroisoquinoline compound (Bischler-Napieralski reaction) occurs on boiling in xylene with phosphorus pentoxide or refluxing in phosphorus oxychloride. Other known dehydrating agents and reaction conditions also bring about this reaction.

The protecting tosyl group is split off in essentially quantitative yield on standing for from 2 to 15 hours in concentrated sulfuric acid at room temperature.

Catalytic hydrogenation of the 3,4-dihydroisoquinolines in acetic acid (platinum catalyst) yields the 1,2,3,4-tetrahydroisoquinolines II. Either palladium or nickel hydrogenation catalysts are alternatively employed. Other reducing agents for 3,4-dihydroisoquinolines are, e.g., zinc/hydrochloric acid, tin/hydrochloric acid and iron/hydrochloric acid.

Compound IX is prepared by refluxing Compound II and bromoacetic ester in alcoholic solution in the presence of, i.e. with, a tertiary base, e.g. triethylamine, for from one to two hours. Saponification of the ester group of IX to the amino acid X is conducted in aqueous alcoholic alkali, and the amino acid is precipitated by adding to the saponified product an equivalent of acid, e.g. hydrochloric acid.

Amino esters IX are alternatively directly cyclized to tetracyclics I either by heating to a temperature of from 150° to 200° C. or by refluxing for several hours, e.g. two to ten hours, in an inert organic solvent, such as dioxane, toluene and xylene. Amino acids X cyclize readily upon heating same above their melting points for from ten to sixty minutes.

When R⁵ of Compound I is a hydrogen atom, it is readily replaced by a lower alkyl, a lower alkenyl or a lower alkinyl group according to the reaction

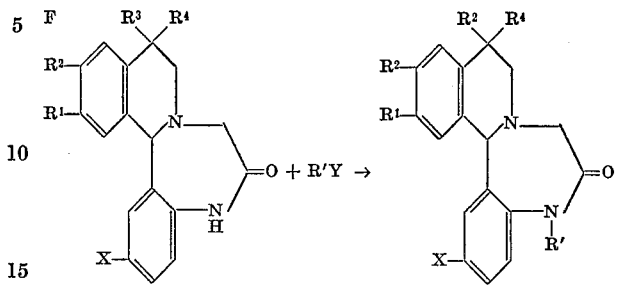

wherein

R' is either lower alkyl, e.g. methyl, ethyl, isopropyl and butyl; lower alkenyl, e.g. allyl; or lower alkinyl, e.g. propargyl; and Y is halo, e.g. bromo (—Br) and iodo (—I).

Reaction F is conducted under the usual conditions for reacting an amido nitrogen-bound hydrogen atom with a halide, i.e. the amide and a strong anhydrous base, e.g. potassium tertiary butoxide and sodium ethoxide, in an inert organic solvent, such as dioxane, dimethylformamide and dimethylsulfoxide, are admixed with an equivalent of halide, R'Y, e.g. methyl iodide.

Compounds I have one asymmetric center when both $R^3$ and $R^4$ are the same and two asymmetric centers when $R^3$ and $R^4$ are different. In the former case Compounds I, therefore, exist as a racemate or two optical antipodes; whereas there are four optically active stereoisomers in the latter case. All of the steriosomers and the racemic mixtures (or racemates) are within the scope of this invention. Resolution of racemic mixtures into optical antipodes or disastereoisomeric compounds is effected according to procedures well-known to the art-skilled.

Exemplary embodiments are presented in the following table. The starting materials and the intermediates (see reactions A to F) are reflected by the definition of substituents.

| Stereo-isomeric form* | $C_{10}/C_{14b}$ | $R^1$ | $R^2$ | $R^3$ | $R^4$ | $R^5$ | X |
|---|---|---|---|---|---|---|---|
| a | | —H | —H | —H | —Me | —Pl | —H |
| b | RR | —Cl | —H | —Et | —Me | —Al | —Cl |
| c | S | —H | —Cl | —H | —H | —Bu | —Br |
| d | RS | —Br | —CH₃ | —H | —Pr | —Pr | —NO₂ |
| e | | —Cl | —Cl | —Bu | —H | —iPr | —NH₂ |
| f | R | —OMe | —Br | —H | —H | —Et | —CF₃ |
| g | SR | —CH₃ | —OEt | —H | —iPr | —Me | —Cl |
| h | | —OMe | —OMe | —Et | —H | —H | —Br |
| i | S | —OiPr | —H | —H | —H | —Pl | —NO₂ |
| j | | —H | —OBu | —H | —Me | —Al | —NH₂ |
| k | SS | —Cl | —OMe | —Bu | —H | —Me | —H |
| l | RS | —O—CH₂—O— | | —H | —iPr | —Me | —Cl |
| m | | —O—CH₂—O— | | —Et | —Et | —H | —Br |
| n | R | —O—CH₂—O— | | —H | —H | —Pl | —NO₂ |
| o | | —O—CH₂—O— | | —H | —Me | —Al | —NH₂ |
| p | RR | —O—CH₂—O— | | —Bu | —H | —Me | —CF₃ |
| q | | —O—CH₂—O— | | —H | —Me | —Pl | —H |
| r | RS | —O—CH₂—O— | | —Et | —H | —Al | —Cl |
| s | S | —O—CH₂—O— | | —H | —H | —Bu | —Br |
| t | SS | —O—CH₂—O— | | —H | —Pr | —Pr | —NO₂ |
| u | SR | —O—CH₂—O— | | —Bu | —H | —iPr | —NH₂ |
| v | | —O—CH₂—O— | | —H | —H | —Et | —H |

Wherein: Me stands for methyl; Et stands for ethyl; Pr stands for propyl; Bu stands for butyl; Al stands for allyl and Pl stands for propargyl.

*Where the stereoisomeric form is undefined, either a racemate, a racemic mixture or a partial racemate is indicated.

Also within the scope of the instant invention are pharmaceutically acceptable acid addition salts, e.g. hydrochloride, furmarate, formate, acetate, citrate, sulfonate, maleinate, tartrate, methane sulfonate, salicylate and hydrosulfate, of Compounds I. These acid addition salts are prepared from the corresponding free bases according to procedures well-known to the art-skilled.

Compounds I and their pharmaceutically acceptable acid addition salts have central nervous system (CNS)

activity. Racemates, racemic mixtures and optically active isomers have anticonvulsant activity, barbiturate potentiation and reinduction, and amphetamine antagonism activity. They are useful as anticonvulsants, sedative and/or sedative-hypnotics, tranquilizers, antianxiety agents, antidepressants and analgesics. The (+)-stereoisomers of Compounds I with one asymmetric center are materially more active in anticonvulsant and barbiturate potentiation activity than their (−)-counterparts.

Said compounds are administered either orally or parenterally from two to three times per day (for higher mammals) in average daily doses of from one to two milligrams per kilogram (mg./kg.) of body weight. They are used in the same manner at the same approximate dosage and for the same purpose as oxazepam.

$N_8$-oxides of Compounds I are prepared by the oxidation of the corresponding Compound I with peracid, e.g. perbenzoic acid, m-chloroperbenzoic acid and peracetic acid, or with hydrogen peroxide in a suitable solvent, such as ethanol, acetic acid and acetic anhydride.

The $N_8$-oxides of Compounds I (including racemates, racemic mixtures and optically active isomers) also have CNS activity, e.g. anticonvulsant and muscle relaxant, and are useful as such in the same manner as Compounds I, but with doses containing from three to four times the amount of active ingredient.

Each of the pharmaceutically active compounds of this invention may be, e.g., incorporated, for oral administration, in a tablet as the sole active ingredient. A typical tablet is constituted by from 1 to 2 percent binder, e.g. tragacanth; from 3 to 10 percent disintegrating agent, e.g. corn starch; from 2 to 10 percent lubricant, e.g. talcum; from 0.25 to 1.0 percent lubricant, e.g. magnesium stearate; an average dosage of active ingredient; and q.s. 100 percent of filler, e.g. lactose; all percentages being by weight. Tablets are prepared according to standard tabletting techniques, which are well-known in the art, employing the necessary amounts of conventional granulating liquids, e.g. alcohol SD-30 and purified water. An exemplary tabletting formulation for the instant active compound is

| | Parts |
|---|---|
| Title compound of Example 30 | 50 |
| Tragacanth | 2 |
| Lactose | 39.5 |
| Corn starch | 5 |
| Talcum | 3 |
| Magnesium stearate | 0.5 |
| Alcohol SD-30, purified water, q.s. | |

The following examples illustrate the invention, all temperatures being in degree centigrade, parts and percentages being by weight unless otherwise specified, and the relationship between parts by weight and parts by volume being the same as that between the kilogram and the liter.

Example 1—N-($\beta$-phenethyl)-2-nitrobenzamide

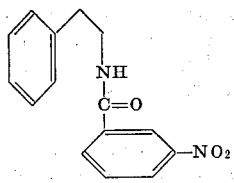

To 3 parts of $\beta$-phenethylamine and 1.1 parts of sodium hydroxide (in 7 parts by volume of water) add dropwise (with vigorous stirring) 5 parts of o-nitro-benzoyl chloride within a period of 30 minutes and at a temperature of from 35° to 40°. Continue stirring for an additional thirty minutes.

Filter off the crystalline reaction product (title compound), and recrystallize same from benzene to obtain white prisms, melting point (M.P.) 117°. [See Rodionov, V. M., and Yarvorskaya, E. V., "J. Gen. Chem." (USSR), 13, 491, 1943; and "C. A.," 38, 3285².]

Replacing the phenethylamine by an equivalent of homopiperonylamine results in the preparation of the corresponding Compound VIII. Replacing the o-nitrobenzoyl chloride by an equivalent of 5-bromo-2-nitrobenzoyl chloride results in the preparation of N-($\beta$-phenethyl)-5-bromo-2-nitrobenzamide.

Example 2.—1-(2-nitro-phenyl)-3,4-dihydroisoquinoline

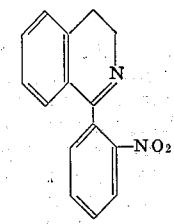

Add 12 parts of phosphorus pentoxide ($P_2O_5$) to a solution of 5 parts of N-($\beta$-phenethyl)-2-nitrobenzamide in 25 parts by volume of xylene and reflux the resulting reaction mixture for two hours.

Thereafter evaporate the organic solvent in vacuo, and then decompose the sticky residue with ice water. Extract the obtained water layer with diethylether to remove residual starting material. Then make the extracted water layer alkaline with concentrated sodium hydroxide.

Filter off the resulting crystalline title compound, and recrystallize same from diethylether/pentane to obtain yellow prisms, M.P. 86° to 87°. [See "C.A.," 38, 3285², supra.]

Replacing the N-($\beta$-phenethyl)-2-nitrobenzamide by an equivalent of either N-(homopiperonyl)-2-nitrobenzamide or N-(3-chloro-$\beta$-phenethyl)-5-chloro-2-nitrobenzamide results in the preparation of the corresponding dihydroisoquinolines.

Example 3.—1-(2-aminophenyl)-1,2,3,4-tetrahydroisoquinoline

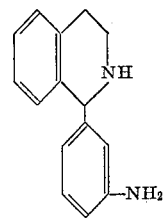

Catalytically hydrogenate (0.5 part of platinum catalyst) a solution of 10 parts of 1-(2-nitrophenyl)-3,4-dihydroisoquinoline in 20 parts by volume of acetic acid and 100 parts by volume of ethanol under a pressure of 40 p.s.i.g. Filter off the catalyst and evaporate the filtrate in vacuo to dryness. Distribute the residue between aqueous sodium bicarbonate and methylenechloride.

Dry the resulting organic phase, evaporate the solvent, and crystallize the residue from ethanol/water to obtain the title compound as white prisms, M.P. 107°.

Replacing the 1-(2-nitrophenyl)-3,4-dihydroisoquinoline by an equivalent of either 1-(2-nitrophenyl)-6,7-methylenedioxy 3,4-dihydroisoquinoline or 1-(5-bromo-2-nitrophenyl)-7-bromo-3,4-dihydroisoquinoline results in the preparation of the corresponding tetrahydroisoquinolines II.

Example 4.—1-(2-aminophenyl)-2-carboxymethyl-
1,2,3,4-tetrahydroisoquinoline

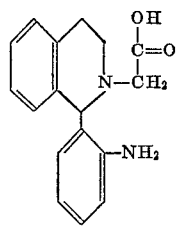

Reflux for 2.5 hours a mixture of 2 parts of 1-(2-aminophenyl)-1,2,3,4-tetrahydroisoquinoline, 3 parts of ethyl bromoacetate and 1 part of triethylamine in 10 parts by volume of ethanol. Evaporate the resulting solution to dryness; dissolve the residue in 20 parts by volume of ethanol and 10 parts by volume of 2 N sodium hydroxide; and heat the obtained solution one hour at 60°.

Add to the thus-heated product 10 parts by volume of 2 N hydrochloric acid. Then evaporate the ethanol in vacuo to crystallize out the title compound.

Replacing the 1-(2-aminophenyl) - 1,2,3,4 - tetrahydroisoquinoline by an equivalent of either 1 - (2 - aminophenyl) - 6,7-methylenedioxy-1,2,3,4-tetrahydroisoquinoline or 1-(2-amino - 5 - chlorophenyl) - 7 - ethoxy-1,2,3,4-tetrahydroisoquinoline results in the preparation of the corresponding 2 - carboxymethyl - 1,2,3,4 - tetrahydroisoquinolines X.

Example 5.—5,9,10,14b-tetrahydroisoquino[2,1-d]
[1,4]benzodiazepin-6(7H)-one

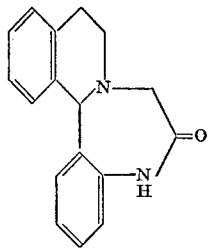

Heat crude 1 - (2 - aminophenyl) - 2 - carboxymethyl-1,2,3,4-tetrahydroisoquinoline at 160° for 30 minutes. Recrystallize the crystalline residue from ethanol to obtain the tetracyclic title Compound I.

Replacing the 1 - (2-aminophenyl) - 2 - carboxymethyl-1,2,3,4-tetrahydroisoquinoline by an equivalent of 1-(2-aminophenyl) - 2 - carboxymethyl - 6,7 - methylenedioxy-1,2,3,4-tetrahydroisoquinoline results in the preparation of the corresponding Compound I.

Examples 1 to 5 illustrate the individual steps in a synthesis of Compounds I. Corresponding Compounds I are prepared starting with any phenethylamine

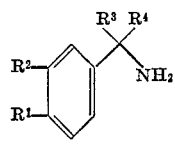

XI and any o-nitrobenzoyl chloride

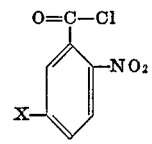

XII

Example 6.—N-(β-phenethyl)-2-nitro-5-chloro-
benzamide

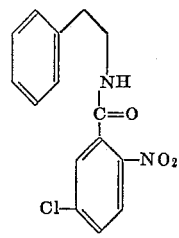

Add a solution of 6 parts of 2-nitro-5-chloro-benzoylchloride in 6 parts of dioxane at 35° to 40° dropwise under vigorous stirring and within 30 minutes to the mixture of 3 parts of β-phenethylamine and 1 part of sodium hydroxide in 15 parts of water and 5 parts of dioxane. Stir another 30 minutes. Add more water to crystallize out the product. Recrystallize from ethyl acetate/diethylether to obtain N-(β-phenethyl)-2-nitro-5-chloro-benzamide as white prisms, M.P. 102° to 104°.

Example 7.—1-(2-nitro-5-chlorophenyl)-3,4-
dihydroisoquinoline

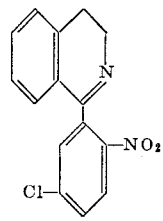

Add 2 parts of phosphorus pentoxide to a hot solution of 1 part of N-(β-phenethyl)-2-nitro-5-chloro-benzamide in 5 parts of xylene and reflux the mixture for 5 hours.

Thereafter evaporate the organic solvent in vacuo and then decompose the sticky residue with ice water. Extract the obtained water layer with diethylether to remove residual starting material. Then make the extracted water layer alkaline with concentrated sodium hydroxide.

Filter off the resulting crystalline title compound and recrystallize same from diethylether/pentane to obtain yellow prisms, M.P. 124° to 125°.

Example 8.—1-(2-amino-5-chloro-phenyl)-1,2,3,4-
tetrahydroisoquinoline

Catalytically hydrogenate (0.2 part of platinum catalyst) a solution of 1 part of 1-(2-nitro-5-chlorophenyl)-3,4-dihydroisoquinoline in 5 parts of acetic acid at room temperature and atmospheric pressure. After filtration and evaporation in vacuo crystallize the residue from ethylacetate/diethylether to obtain 1-(2-amino-5-chlorophenyl)-1,2,3,4-tetrahydroisoquinoline as white crystals, M.P. 125° to 127°.

Example 9.—1-(2-amino-5-chlorophenyl)-2-carboxymethyl-1,2,3,4-tetrahydroisoquinoline Reflux the mixture of 5 parts of 1-(2-amino-5-chlorophenyl)-1,2,3,4-tetrahydroisoquinoline, 4 parts of ethyl bromoacetate, 2.5 parts of triethylamine and 1 part of sodium iodide in 100 parts by volume of ethanol for two hours. Evaporate the reaction mixture to dryness, dissolve the residue in 150 parts by volume of ethanol and 40 parts by volume of 2 N sodium hydroxide. Heat the obtained solution 3 hours at 60°. Evaporate the alcohol in vacuo from the resultant, whereupon some starting material precipitates out. Thereafter add to the supernatant 40 parts by volume of 2 N hydrochloric acid to precipitate out the reaction product as fine white crystals. Recrystallize same from ethanol to obtain 1-(2-amino - 5 - chlorophenyl)-2-carboxymethyl-1,2,3,4-tetrahydroisoquinoline, M.P. 163° to 165°.

Example 10.—2-chloro-5,9,10,14b-tetrahydroisoquino[2,1-d][1,4]benzodiazepin-6(7H)-one

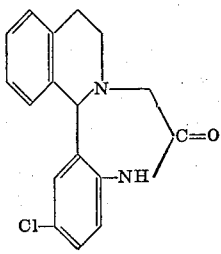

Heat crude 1 - (2-amino-5-chlorophenyl)-2-carboxymethyl-1,2,3,4-tetrahydroisquinoline at 170° for 30 minutes. Recrystallize the crystalline raw-product from ethanol to obtain 2-chloro-5,9,10,14b-tetrahydroisoquino-[2,1-d][1,4]benzodiazepin - 6(7H) - one as white prisms, M.P. 220° to 222°.

Example 11.—2-chloro-5-ethyl-5,9,10,14b-tetrahydroisoquino[2,1-d][1,4]benzodiazepin-6(7H)-one

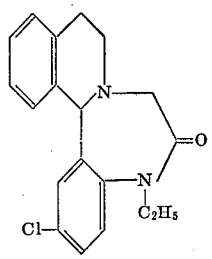

Add 0.8 part of potassium tertiary butoxide to the solution of 2 parts of 2-chloro-5,9,10,14d-tetrahydroisoquino[2,1-d][1,4]benzodiazepin-6(7H)-one in 25 parts by volume of dimethylsulfoxide (DMSO). After maintaining the product for fifteen minutes at room temperature, add dropwise thereto 1 part of ethyl iodide. Maintain the resultant reaction mixture at room temperature over night and then dilute same slowly with water, whereby 2-chloro-5 - ethyl-5,9,10,14b-tetrahydroisoquino[2,1-d][1,4]benzodiazepin-6(7H)-one precipitates out as white needles, M.P. 171° to 173°.

This example illustrates reaction F. In the same manner a nitrogen-bound hydrogen atom in the 5-position of any compound I is replaced by any other substituent $R^5$.

Replacing the 2 - chloro - 5,10,14b - tetrahydroisoquino[2,1-d][1,4]benzodiazepin-6(7H)-one by an equivalent of 2-chloro-12,13-methylenedioxy-5,9,10,14b-tetrahydroisoquino[2,1-d][1,4]benzodiazepin-6(7H) - one results in the preparation of the corresponding compound I.

Replacing the ethyl iodide by an equivalent of either propargyl bromide or allyl chloride results in the preparation of a compound I having the corresponding substituent $R^5$.

Example 12.—N-(β-phenethyl)-2-methylamino-5-chloro-benzamide

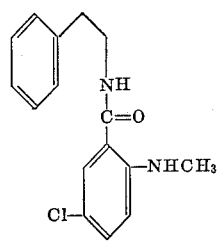

Heat the mixture of 2 parts of 5-chloro-N-methyl-isatoic anhydride and 3 parts of β-phenethylamine in 10 parts of dioxane for 15 minutes on a water bath, whereby vigorous carbon dioxide evolution takes place. Add water to the obtained solution to precipitate N-(β-phenethyl)-2-methylamino-5-chloro-benzamide, M.P. 129° to 131°.

This example illustrates reaction B. Replacing the β-phenethylamine with an equivalent of any compound III, e.g., 4-chloro-β-phenethylamine, results in the preparation of the corresponding compound VI. Likewise, replacing the 5-chloro-N-methyl-isatoic anhydride by an equivalent of either 5-chloro-isatoic anhydride or isatoic anhydride results in the preparation of the corresponding compound VI.

Example 13.—Tosylate of N-(β-phenethyl)-2-methylamino-5-chloro-benzamide

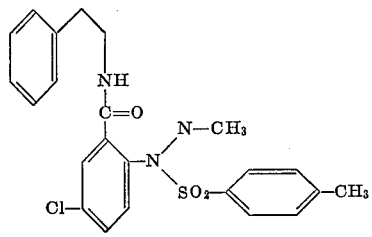

Add 1 part of p-toluene sulfonyl chloride to the solution of 1 part of N-(β-phenethyl)-2-methylamino-5-chlorobenzamide in 5 parts of pyridine and heat the obtained mixture at 60° for 1.5 hours. Evaporate the resultant in vacuo, add 3 parts of acetone and 1 part of water to the product, and shake the obtained reaction mixture for 30 minutes. After evaporation of the acetone, add ethyl acetate thereto and extract the organic layer thoroughly with dilute hydrochloric acid and sodium bicarbonate solution. Dry the organic phase over sodium sulfate and evaporate the dried product to dryness to obtain the tosylate of N-(β-phenethyl)-2-methylamino-5-chloro-benzamide as an oily residue.

Replacing the N - (β - phenethyl) - 2 - methylamino-5-chloro-benzamide by an equivalent of either N-(homopiperonyl)-2-methylamino-5-chloro-benzamide or N-(β-phenethyl)-2-amino-5-chloro-benzamide results in the preparation of the corresponding tosylate.

Example 14.—1-(2-methyltosylamino-5-chloro-phenyl)-3,4-dihydroisoquinoline hydrochloride

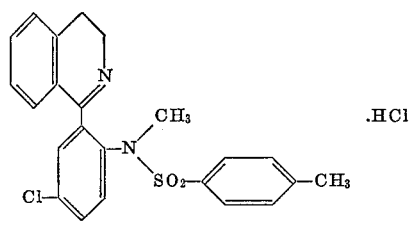

Dissolve the crude tosylate (from Example 13) in 10 parts by volume of xylene, and add 4 parts of phosphorus pentoxide to the obtained solution. Reflux the resulting reaction mixture overnight (15 hours). Evaporate the xylene in vacuo and decompose the sticky residue by addition of ice thereto. Make the aqueous mixture alkaline with concentrated aqueous sodium hydroxide solution, and extract the alkaline product with methylene chloride. After drying and evaporating the organic solvent, dissolve the oily residue in diethylether, and precipitate the hydrochloride of 1-(2-methyltosylamino-5-chloro-phenyl)-3,4-dihydroisoquinoline, M.P. 240° to 241°, by bubbling hydrogen chloride gas through the obtained ether solution.

Example 15.—1-(2-methylamino-5-chloro-phenyl)-3,4-dihydroisoquinoline

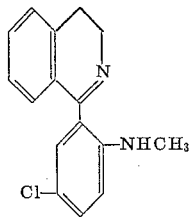

Gradually add 4 parts by volume of concentrated sulfuric acid under cooling to 1 part of the hydrochloride described in Example 14 and maintain the obtained solution at room temperature overnight. Pour said solution on ice; make it alkaline with sodium hydroxide; and extract the alkaline solution with methylene chloride. Dry and evaporate the organic solvent to obtain 1-(2-methylamino-5-chloro-phenyl)-3,4-dihydroisoquinoline as an oily residue.

Example 16.—1-(2-methylamino-5-chloro-phenyl)-1,2,3,4-tetrahydroisoquinoline

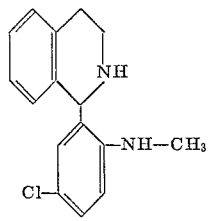

Catalytically hydrogenate (0.02 part of platinum catalyst) a solution of 1 part of crude 1-(2-methylamino-5-chloro-phenyl)-3,4-dihydroisoquinoline (described in Example 15) in 8 parts of acetic acid at room temperature and under atmospheric pressure. Filter off the catalyst, evaporate the filtrate in vacuo, dissolve the residue in methylene chloride, and shake the resulting solution with dilute sodium hydroxide (aq.) solution. After drying and concentrating the organic layer, add pentane thereto to crystallize 1 - (2 - methylamino-5-chloro-phenyl)-1,2,3,4-tetrahydroisoquinoline as white prisms, M.P. 141° to 143°.

Example 17.—1-(2-methylamino-5-chloro-phenyl)-2-carboxymethyl-1,2,3,4-tetrahydroisoquinoline

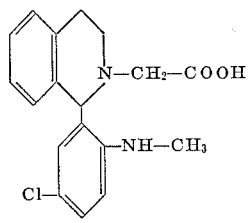

Reflux the mixture of 8 parts of 1-(2-methylamine-5-chloro-phenyl)-1,2,3,4-tetrahydroisoquinoline, 10 parts of ethyl bromoacetate and 6.5 parts of triethylamine in 75 parts by volume of ethanol for two hours. Evaporate the obtained solution to dryness; dissolve the residue in 80 parts of ethanol and 32 parts of 2 N sodium hydroxide; and heat the resulting solution one hour to 60°. Evaporate the ethanol in vacuo, whereby a small amount of starting material crystallizes out. Filter this off. Add to the filtrate 32 parts of 2 N hydrochloric acid to precipitate out 1-(2-methylamino - 5-chloro-phenyl)-2-carboxymethyl-1,2,3,4-tetrahydroisoquinoline.

Example 18.—2-chloro-5-methyl-5,9,10,14b-tetrahydro-isoquino[2,1-d][1,4]benzodiazepin-6(7H)-one

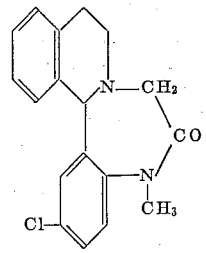

Heat crude 1-(2-methylamino-5-chloro-phenyl)-2-carboxymethyl - 1,2,3,4-tetrahydroisoquinoline (from Example 17) to 140° for 1 hour. Dissolve the raw product in diethylether, and precipitate the hydrochloride, M.P. 267° to 270°, of 2 - chloro - 5-methyl-5,9,10,14b-tetrahydroisoquino[2,1-d][1,4]benzodiazepin-6(7H)-one from the resulting solution by bubbling therethrough dry hydrogen chloride gas. Precipitate the free base from the aqueous solution of the hydrochloride by adding thereto sodium hydroxide; recrystallize the free base, M.P. 95° to 97°, from ethanol-water.

Examples 12 to 18 illustrate reactions B and E. These reactions are effected in the same manner to prepare corresponding compounds I wherein $R^1$ and $R^2$, together, form methylenedioxy and to prepare corresponding compounds I wherein $R^5$ is a hydrogen atom.

Example 19.—N-(homoveratryl)-2-methylamino-5-chloro-benzamide

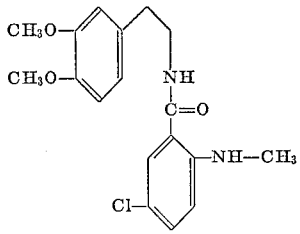

Heat the mixture of 1 part of 5-chloro-N-methyl-isatoic anhydride and 1 part of homoveratrylamine in 4 parts of dioxane for fifteen minutes on a water bath, whereby vigorous carbon dioxide evolution takes place. Add water to the resulting solution to precipitate N-(homoveratryl)-2-methylamino-5-chloro-benzamide, M.P. 96° to 98°.

Example 20.—Tosylate of N-(homoveratryl)-2-methylamino-5-chloro-benzamide

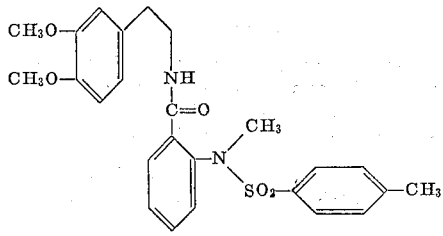

Add 3 parts of p-toluene sulfonyl chloride to the solution of 4 parts of N-(homoveratryl)-2-methylamino-5-chloro-benzamide in 12 parts of pyridine and heat the mixture obtained at 60° for 1.5 hours. Add 12 parts of acetone and 4 parts of water to the thus-treated mixture and then shake same for 30 minutes. After evaporation to a small volume add ethyl acetate and extract the organic phase with dilute hydrochloric acid and sodium hydroxide solution. Dry and evaporate the organic solvent to obtain the tosylate of N - (homoveratryl) - 2 - methylamino - 5-chloro-benzamide as an amorphous residue.

Example 21.—1-(2-methyltosylamino-5-chloro-phenyl)-6,7-dimethoxy-3,4-dihydroisoquinoline

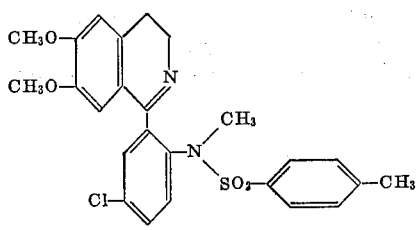

Dissolve the crude tosylate (from Example 20) in 5 parts of hot xylene, and add 2 parts of phosphorus pentoxide to the obtained reaction mixture. Reflux said reaction mixture for 15 hours. Evaporate the xylene in vacuo and decompose the sticky residue by addition thereto of ice. Make the aqueous mixture alkaline with concentrated aqueous sodium hydroxide solution, and extract with ethyl acetate. Extract the combined organic layers with dilute hydrochloric acid. Make the water layers alkaline again in the same manner as above-described, and extract same with methylene-chloride to obtain 1-(2-methyltosylamino-5-chloro-phenyl)-6,7-dimethoxy-3,4 - dihydroisoquinoline as an amorphous residue.

Example 22.—1-(2-methylamino-5-chloro-phenyl)-6,7-dimethoxy-3,4-dihydroisoquinoline

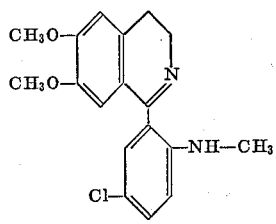

Maintain the solution of 1 part of the crude product (described in Example 21) in 2.5 parts of concentrated sulfuric acid at room temperature over night. Thereafter add thereto ice water and sodium hydroxide and extract the thus-obtained smeary precipitate with methylenechloride. Evaporate the solvent and crystallize the residue from ethanol to obtain 1-(2-methylamino-5-chloro-phenyl)-6,7-dimethoxy - 3,4 - dihydroisoquinoline, M.P. 110° to 112°.

Example 23.—1-(2-methylamino-5-chloro-phenyl)-6,7-dimethoxy-1,2,3,4-tetrahydroisoquinoline

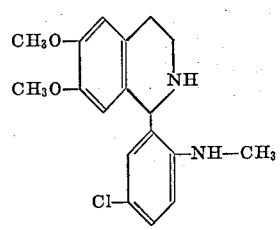

Catalytically hydrogenate (0.05 part of platinum catalyst) the solution of 1 part of 1-(2-methylamino-5-chloro-5-phenyl)-6,7-dimethoxy - 3,4 - dihydroisoquinoline in 8 parts of acetic acid at room temperature and atmospheric pressure. Filter off the catalyst; evaporate the filtrate in vacuo; and distribute the residue between methylene chloride and dilute sodium hydroxide solution. After drying and evaporating the organic solvent, crystallize the oily residue from ethyl acetate/diethylether to obtain 1-(2 - methylamino - 5 - chloro-phenyl)-6,7-dimethoxy-1,2,3,4-tetrahydroisoquinoline, M.P. 145° to 147°.

Example 24.—1-(2-methylamino-5-chloro-phenyl)-2-carboxymethyl - 6,7 - dimethoxy - 1,2,3,4 - tetrahydroisoquinoline

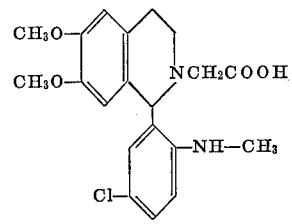

Reflux the mixture of 1 part of 1-(2-methylamino-5-chloro-phenyl) - 6,7 - dimethoxy - 1,2,3,4 - tetrahydroisoquinoline, 1 part of ethyl bromoacetate, 0.6 part of triethylamine and 0.1 part of sodium iodide in 8 parts by volume of ethanol for two hours. Thoroughly evaporate the obtained solution to dryness in vacuo; dissolve the residue in 10 parts by volume of ethanol and 3 parts of 2 N sodium hydroxide; and heat the resulting solution for 1 hour at 60°. Evaporate the alcohol in vacuo, whereby a small amount of starting material crystallizes out. Filter same off. Add 3 parts of 2 N hydrochloric acid to the filtrate to precipitate 1-(2-methylamino-5-chloro-phenyl)-2-carboxymethyl-6,7-dimethoxy - 1,2,3,4 - tetrahydroisoquinoline.

Example 25.—2 - chloro - 12,13 - dimethoxy - 5 - methyl-5,9,10,14b - tetrahydroisoquino[2,1-d][1,4]benzodiazepin-6(7H)-one

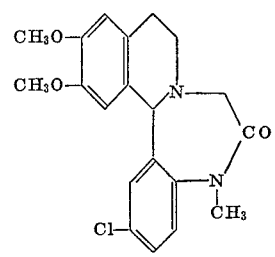

Heat crude 1-(2-methylamino-5-chloro-phenyl)-2-carboxymethyl-6,7-dimethoxy - 1,2,3,4 - tetrahydroisoquinoline (from Example 24) at 150° for 1 hour. Crystallize the raw product from ethylacetate to obtain the title compound, M.P. 175° to 177°.

Examples 19 to 25 illustrate the preparation of compounds I having substituents in the 12- and 13-positions. In the same manner the corresponding 12,13-methylenedioxy-compounds I are prepared from corresponding starting materials and intermediates. Repeating the procedures of Examples 19 to 25 replacing the homoveratrylamine starting material (see Example 19) by an equivalent of either β-methyl or β,β-dimethyl-homoveratrylamine results in the preparation of the corresponding compounds I.

Example 26.—Resolution of racemic 1-(2-methylamino-5-chloro-phenyl)-1,2,3,4-tetrahydroisoquinoline into its optical antipodes

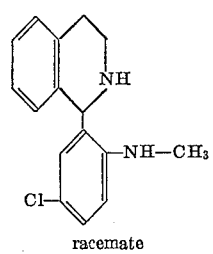

racemate

Add a solution of 8.25 parts of D(+)-tartaric acid in 100 parts by volume of ethanol to a solution of 15 parts of (±)-1-(2-methylamino-5-chloro-phenyl)-1,2,3,4-tetrahydrosioquinoline in 200 parts by volume of ethanol and 100 parts of methylene chloride. On concentrating this mixture, only the tartrate of the (+) base crystallizes.

Filter off the precipitate and free the base from this salt by distributing the filtrate between methylene chloride and dilute aqueous sodium hydroxide solution; dry the organic phase and evaporate the solvent in vacuo. Crystallize the residual crude base from ethanol to obtain (+) - 1 - (2-methylamino-5-chloro-phenyl)-1,2,3,4-tetrahydroisoquinoline, $$[\alpha]_{546}^{20} = +27.3° \text{ (c.} = 2 \text{ in ethanol)}$$

Evaporate the filtrate of the tartrate of the (+)-base to dryness in vacuo and distribute the residue between methylene chloride and dilute aqueous sodium hydroxide solution. Dry the organic phase and evaporate the solvent therefrom in vacuo. Transfer the residue, consisting essentially of the (−) base, in exactly the same way as described above to the crystalline L(−)-tartrate by addition of L(−)-tartaric acid. The free base (−)-1-(2-methylamino-5-chloro-phenyl) - 1,2,3,4 - tetrahydroisoquinoline, prepared from the tartrate as described for the (+) base, has $$[\alpha]_{546}^{20} = -27.8° \text{ (c.} = 2 \text{ in ethanol)}$$

Example 27.—(+)-1-(2-methylamino-5-chloro-phenyl)-2-carboxymethyl-1,2,3,4-tetrahydroisoquinoline

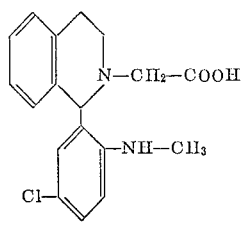

Reflux the mixture of 8 parts of (+)-1-(2-methylamino-5-chlorophenyl)-1,2,3,4-tetrahydroisoquinoline, 10 parts of ethyl bromoacetate and 6.5 parts of triethylamine in 75 parts by volume of ethanol for two hours. Evaporate the obtained solution to dryness; dissolve the residue in 80 parts by volume of ethanol and 32 parts by volume of 2 N sodium hydroxide, and heat this solution one hour to 60°. Evaporate the alcohol in vacuo, whereby a small amount of starting material crystallizes out and is filtered off. On addition of 32 parts by volume of 2 N hydrochloric acid, (+)-1-(2-methylamino-5-chloro-phenyl)-2-carboxymethyl-1,2,3,4-tetrahydroisoquinoline precipitates out, $$[\alpha]_{546}^{20} = +64.5° \text{ (c.} = 1.3 \text{ in ethanol)}$$

Example 28.—(−)-2-chloro-5-methyl-5,9,10,14b-tetrahydroisoquino[2,1-d][1,4]benzodiazepin-6(7H)-one hydrochloride

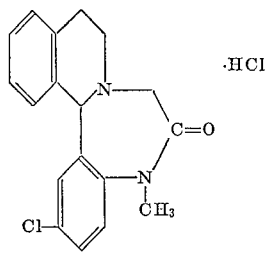

Heat crude (+)-1-(2-methylamino-5-chloro-phenyl)-2-carboxymethyl-1,2,3,4-tetrahydroisoquinoline to 140° for one hour. Dissolve the raw product in acetone and precipitate the hydrochloride of (−)-2-chloro-5-methyl-5,9,10,14b - tetrahydroisoquino[2,1-d][1,4]benzodiazepin-6(7H)-one by bubbling in dry hydrogen chloride gas, $[\alpha]_{546}^{20} = -313°$ (C.=2 in water). Precipitate the free base from the aqueous solution of the hydrochloride on addition of sodium hydroxide and recrystallize from ethanol-water, M.P. 156° to 157°, $$[\alpha]_{546}^{20} = -409° \text{ (c.} = 0.6 \text{ in ethanol)}$$

Example 29.—(−)-1-(2-methylamino-5-chloro-phenyl)-2-carboxymethyl-1,2,3,4-tetrahydroisoquinoline

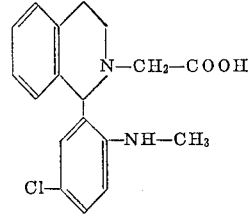

Reflux the mixture of 8 parts of (−)-1-(2-methylamine-5-chloro-phenyl)-1,2,3,4-tetrahydroisoquinoline, 10 parts of ethyl bromoacetate and 6.5 parts of triethylamine in 75 parts by volume of ethanol for two hours. Evaporate the solution to dryness, dissolve the residue in 80 parts of ethanol, add 32 parts of 2 N sodium hydroxide and heat this solution one hour to 60°. Evaporate the alcohol in vacuo, whereby a small amount of starting material crystallizes out. Filter off the precipitate. Add 32 parts of 2 N hydrochloric acid to the filtrate to obtain (−)-1-(2 - methylamino-5-chloro-phenyl) - 2 - carboxymethyl-1,2,3,4-tetrahydroisoquinoline, $$[\alpha]_{546}^{20} = -64° \text{ (c.} = 1.5 \text{ in ethanol)}$$

Example 30.—(+)-2-chloro-5-methyl-5,9,10,14b-tetrahydroisoquino[2,1-d][1,4]benzodiazenpin-6(7H)-one hydrochloride

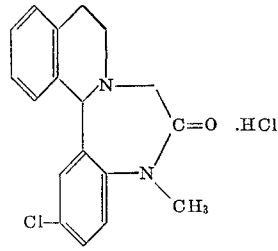

Heat crude (−)-1-(2-methylamino-5-chloro-phenyl)-2-carboxymethyl-1,2,3,4-tetrahydroisoquinoline (from Example 29) at 140° for one hour. Dissolve the raw product in acetone and precipitate the hydrochloride of (+)-2-chloro-5-methyl-5,9,10,14b-tetrahydroisoquino[2,1 - d][1,4]benzodiazeopin-6(7H)-one, $$[\alpha]_{546}^{20} = +310° \text{ (c.} = 2 \text{ in water)}$$

by bubbling in dry hydrogen chloride gas.

Precipitate the free base from the aqueous solution of the hydrochloride by addition of sodium hydroxide and recrystallize it from ethanol-water, M.P. 156° to 157°, $$[\alpha]_{546}^{20} = +410° \text{ (c.} = 0.7 \text{ in ethanol)}$$

An alternative method of preparing compounds I from available compounds is in accord with the following reactions:

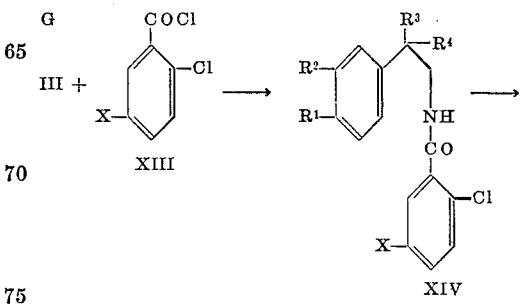

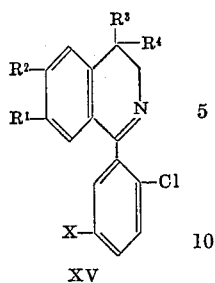

XV

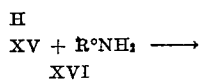

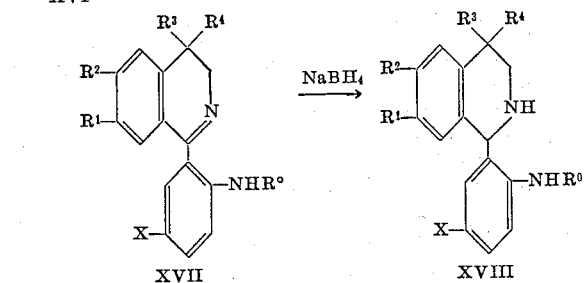

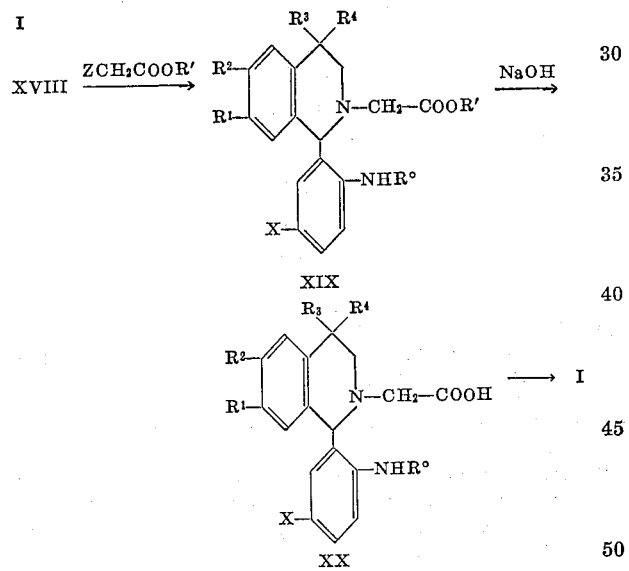

For reaction G a solution of the acid chloride XIII in an inert solvent is added dropwise into a solution of phenethylamine III in an inert solvent and pyridine (as a base). The inert solvent for each of III and XIII is, independently, e.g., dioxane and tetrahydrofurane (THF). Alternatively, Schotten-Baumann conditions are employed to carry out this acylation for the preparation of compounds XIV.

Compound XVI is either ammonia ($NH_3$) or lower alklamine. The first step of reaction H is a standard amination wherein a ring halogen atom is replaced, and the second step is a reduction of a double bond with sodium borohydride to prepared compounds XVIII. It is apparent that each of the compounds XVII and XVIII contains a secondary amino group when compound XVI is a lower alkylamine, such as methylamine and ethylamine.

In the first step of reaction I compound XVIII is reacted with a lower alkyhaloacetate, e.g. ethylbromoacetate (Z is either chloro or bromo, and R' is lower alkyl, preferably methyl or ethyl). The resulting ester XIX is saponified with sodium hydroxide to produce the acid XX. Ring closure (to obtain compound I) is effected by heating compound XX over its melting point for from one to three hours.

Example 31.—N-(β-phenethyl)-2-chloro-5-nitrobenzamide

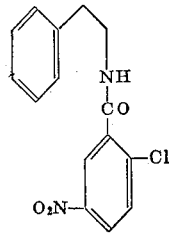

Add dropwise (within a period of thirty minutes) a solution of 33 parts of 2-chloro-5-nitrobenzoyl chloride in 70 parts by volume of dry dioxane to a mixture (under agitation) of 20 parts of phenethylamine, 20 parts by volume of pyridine and 50 parts by volume of dioxane. Continue stirring the resultant at room temperature (20°) for two hours before adding thereto 20 parts of ice. To the thus-cooled material (being stirred) add dropwise dilute sodium hydroxide until the pH is 10. Dilute the thus-obtained mixture with 200 parts by volume of water to precipitate the title compounds, melting point (M.P.) 155°. Filter the precipitate and dry same in vacuo.

Example 32.—1-(2-chloro-5-nitrophenyl)-3,4-dihydroisoquinoline

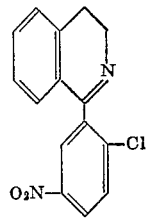

Add 2 parts of phosphorus pentoxide ($P_2O_5$) to a solution of 1 part of N-(β-phenethyl)-2-chloro-5-nitrobenzamide in 10 parts by volume of xylene and reflux the resulting reaction mixture for 15 hours. Thereafter decant the organic solvent (xylene), and then decompose the sticky residue with ice water. Make the obtained aqueous mixture alkaline with concentrated sodium hydroxide, and extract the resulting aqueous phase with ethyl acetate. Dry the ethyl acetate solution (extract) over sodium sulfate and then evaporate the solution to dryness in vacuo. Crystallize the thus-obtained residue from diethylether to obtain the title compound, M.P. 145°.

Example 33.—1-(2-methylamino-5-nitrophenyl)-3,4-dihydrosioquinoline

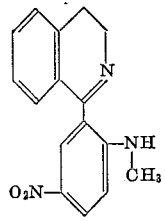

Heat (autoclave) for 12 hours at 55° to 60° in 10 parts by volume of liquid methylamine a mixture of 1 part of 1 - (2-chloro-5-nitrophenyl)-3,4-dihydroisoquinoline, 0.05 part of cuprous chloride and 0.05 part of copper powder. Cool the resultant and evaporate the methylamine therefrom at room temperature. Admix the thus-obtained residue with 10 parts by volume of methylene chloride and filter off insoluble material. Wash the filtrate twice with water; dry the washed filtrate over sodium sulfate and evaporate in vacuo to obtain 0.9 part of the title compound as an amorphous residue. Crystallize said title compound from diethylether to obtain light yellow prisms, M.P. 148°.

Replacing the methylamine with an equivalent of either ethylamine or propylamine results in the preparation, in similar manner, of the corresponding compound XVII.

Example 34.—1-(2-methylamino-5-nitrophenyl)-1,2,3,4-tetrahydroisoquinoline

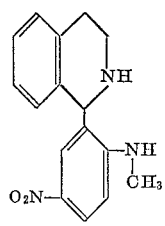

Reflux for two hours in 30 parts by volume of 95% ethanol and 6 parts by volume of chloroform, a mixture of 1 part of 1-(2-methyl-amino-5-nitrophenyl)-3,4-dihydroisoquinoline and 0.6 part of sodium borohydride. Cool the obtained solution before admixing same with 2 N hydrochloric acid to destroy excess sodium borohydride. Alkalize the resultant with 2 N sodium hydroxide solution and distill off most of the ethanol in vacuo. Extract the resultant mixture three times with ethyl acetate, dry the organic phase (ethyl acetate solution) over sodium sulfate and then evaporate same in vacuo to obtain 1 part of crude crystalline title compound, M.P. 178°, recrystallized from diethylether.

Replacing the title compound of Example 33 with an equivalent of either 1-(2-ethylamino-5-nitrophenyl)-3,4-dihydroisoquinoline or 1-(2-propylamino-5-nitrophenyl)-3,4-dihydroisoquinoline results in the preparation, in similar manner, of the corresponding compound XVIII.

Example 35.—1-(2-methylamino-5-nitrophenyl)-2-carboxymethyl-1,2,3,4-tetrahydroisoquinoline

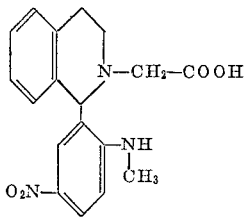

Reflux for four hours in 300 parts by volume of ethanol and 100 parts by volume of dioxane, a mixture of 30 parts of 1 - (2-methylamino-5-nitrophenyl)-1,2,3,4-tetrahydroisoquinoline, 37 parts of ethyl bromoacetate, 21 parts by volume of triethylamine and 16 parts of sodium iodide. Evaporate the solvent in vacuo; dissolve the residue in ethylacetate and wash the ethylacetate solution with water and dilute sodium hydrogen carbonate (NaHCO₃) solution. Dry the organic phase over sodium sulfate and then evaporate same in vacuo. Dissolve the obtained residue in 50 parts by volume of ethanol and 13 parts by volume of dioxane; add 17 parts by volume of 2 N sodium hydroxide to the thus-produced solution and heat the resulting mixture for 4 hours at 60°. Neutralize the resultant solution with 17 parts by volume of 2 N hydrochloric acid, and dilute with 100 parts of water to precipitate the title compound, M.P. 155°.

Replacing the ethyl bromoacetate with an equivalent of either ethyl chloroacetate or methyl bromoacetate results in the preparation, in similar manner, of the corresponding compound XIX as an intermediate for the identical title compound.

Replacing the title compound of Example 34 with an equivalent of either 1-(2-ethylamino-5-nitrophenyl)-1,2,3,4-tetrahydroisoquinoline or 1-(2-propylamino-5-nitrophenyl)-1,2,3,4-tetrahydroisoquinoline results in the preparation, in similar manner, of the corresponding compound XX.

Example 36.—2-nitro-5-methyl-5,9,10,14b-tetrahydroisoquino[2,1-d][1,4]benzodiazepin-6(7H)-one

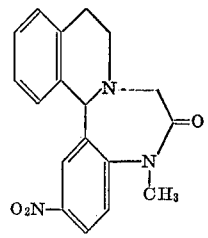

Heat the title compound of Example 35 at 160° for 1½ hours. Crystallize the obtained amorphous residue from ethylacetate-diethylether to obtain the title compound as yellow prisms, M.P. 223°.

Replacing the title compound of Example 35 with an equivalent of either 1-(2-ethylamino-5-nitrophenyl)-2-carboxymethyl - 1,2,3,4 - tetrahydroisoquinoline or 1 - (2-propylamino-5-nitrophenyl) - 2 - carboxymethyl - 1,2,3,4-tetrahydroisoquinoline results in the preparation, in similar maner, of the corresponding compound I.

Example 37.—1-(2-amino-5-nitrophenyl)-3,4-dihydroisoquinoline

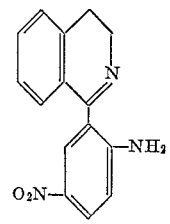

Heat (autoclave) for 12 hours at 55° to 60° in 20 parts by volume of liquid ammonia, a mixture of 1 part of the title compound of Example 32, 0.05 part of cuprous chloride and 0.05 part of copper powder. Cool the resultant and evaporate the ammonia at room temperature. Admix the thus-obtained residue with 10 parts by volume of methylene chloride and filter off insoluble material. Wash the organic (methylene chloride) phase twice with water; dry over sodium sulfate and evaporate in vacuo to obtain 0.9 part of the crude title compound, which is crystallized from diethylether as yellow prisms, M.P. 152°.

Example 38.—1-(2-amino-5-nitrophenyl)-1,2,3,4-tetrahydroisoquinoline

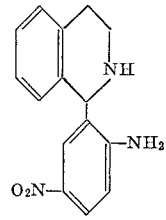

Reflux for two hours in 30 parts by volume of 95% ethanol and 6 parts by volume of chloroform, a mixture of 1 part of the title compound of Example 37 and 0.6 part of sodium borohydride. Cool the obtained solution before admixing same with 2 N hydrochloric acid to destroy excess sodium borohydride. Alakize the resultant with 2 N sodium hydroxide solution and distill off most of the ethanol in vacuo. Extract the resultant mixture three times with ethylacetate, dry the organic phase (ethylacetate solution) over sodium sulfate and then evaporate same in vacuo to obtain 1 part of crude crystalline title compound, M.P. 190° recrystallized from ethylacetate.

Example 44.—2-chloro-5,10-dimethyl-5,9,10,14b-tetra-hydroisoquino[2,1-d][1,4]benzodiazepin-6(7H)-one (a) N-(2-phenylpropyl)-2-methylamino - 5 - chlorobenzamide.

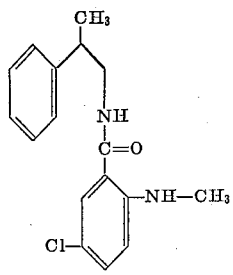

Heat the mixture of 2 parts of 5-chloro-N-methyl-isatoic anhydride and 1.6 parts of 2-phenylpropylamine in 10 parts by volume of dioxane for 15 minutes on a water bath, whereby vigorous carbon dioxide evolution takes place. Add water to the obtained solution to precipitate 3 parts of (a), M.P. 100° to 103°.

(b) Tosylate of (a)

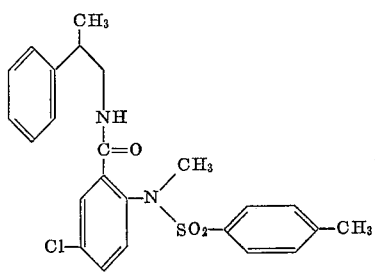

Add 1 part of p-toluenesulfonyl chloride to the solution of 0.8 part of (a) in 2.5 parts by volume of pyridine, and heat the obtained mixture at 60° for 1.5 hours. Evaporate the resultant in vacuo, add 3 parts by volume of acetone and 1 part by volume of water to the product, and shake the obtained reaction mixture for 30 minutes. After evaporation of the acetone, add ethyl acetate to the remainder and extract the organic layer thoroughly with dilute hydrochloric acid and sodium bicarbonate solution. Dry the organic phase over sodium sulfate and evaporate the thus-dried organic phase to dryness to obtain 1 part of (b), M.P. 89° to 91° with decomposition.

(c) 1-(2-methyltosylamino - 5 - chlorophenyl)-4-methyl-3,4-dihydroisoquinoline hydrochloride

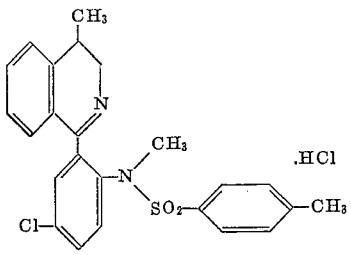

Add 10 parts of the tosylate (b) to 43 parts by volume of phosphorus oxychloride and reflux the resulting mixture for 15 hours. Cool the refluxed product to room temperature and evaporate in vacuo. Dissolve the obtained residue in 300 parts by volume of methylene chloride. Wash the thus-prepared solution first with ice-cold 1 N (aq.) sodium hydroxide (2 washings with approximately 120 parts by volume of the sodium hydroxide solution for each), then with water and finally with saturated (aq.) sodium chloride solution.

Dry the thus-washed organic phase over sodium sulfate and evaporate the obtained solution in vacuo. Dissolve the residue in 60 parts by volume of acetone, and saturate the resulting solution with dry hydrogen chloride gas. Add 30 parts by volume of diethylether to the saturated solution to precipitate 5.2 parts of (c), M.P. 254°.

(d) 1-(2-methylamino - 5 - chlorophenyl)-4-methyl-3,4-dihydroisoquinoline

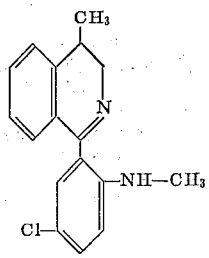

Gradually add 100 parts by volume of concentrated sulfuric acid (with cooling) to 46 parts of (c), and maintain the obtained solution at room temperature over night. Pour said solution onto ice; make it alkaline with sodium hydroxide; and extract the alkaline solution with methylene chloride. Dry and evaporate the organic solvent to obtain 20 parts of (d), M.P. 108° to 110°.

(e) 1-(2 - methylamino - 5 - chlorophenyl) - 4 - methyl-1,2,3,4-tetrahydroisoquinoline

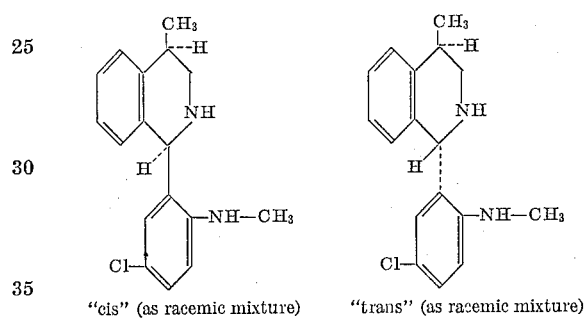

"cis" (as racemic mixture)    "trans" (as racemic mixture)

Suspend 18.5 parts of (d) in 200 parts by volume of 95% ethanol, add 7 parts of sodium borohydride to the obtained suspension, and reflux the resultant for 1 hour. Cool the refluxed product to room temperature, and then acidify with 2 N hydrochloric acid. Thereafter add 2 N (aq.) sodium hydroxide until the pH of the obtained solution is about 9. Evaporate in vacuo to one third of volume. Extract the concentrated solution twice with water and saturated sodium chloride solution, dry the thus-washed material over sodium sulfate, and evaporate the dried resultant in vacuo to obtain an oily residue. Crystallize the oily residue from diethylether/pentane to obtain 14 parts of (e), "cis" form, M.P. 142° to 144°, and 2.2 parts of (e), "trans" form, M.P. (after recrystallization from diethylether/pentane) 81° to 84°.

(f) 1-(2 - methylamino - 5 - chlorophenyl) - 2 - carbomethoxymethyl-4-methyl-1,2,3,4-tetrahydroisoquinoline

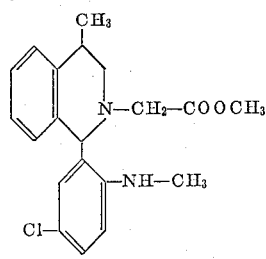

Dissolve 2 parts of (e), "cis" form, in 20 parts by volume of absolute ethanol, and mix the obtained solution with 1.7 parts of methyl bromoacetate and 2 parts of triethylamine. Reflux the resulting mixture for four hours. Then evaporate the solvent.

Mix the residue with 200 parts by volume of ethylacetate and 100 parts by volume of water; separate the phases; extract the aqueous phase twice with 100 parts by volume (each) of ethylacetate; unify the organic phases and wash them with water and saturated sodium chloride solution;

Example 39.—1-(2-amino-5-nitrophenyl)-2-carboxymethyl-1,2,3,4,-tetrahydroisoquinoline

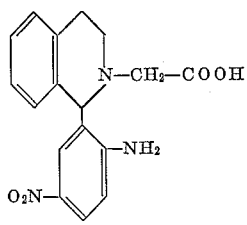

Reflux for four hours in 300 parts by volume of ethanol and 100 parts by volume of dioxane, a mixture of 30 parts of title compound of Example 38, 37 parts of ethyl bromoacetate, 21 parts by volume of triethylamine and 16 parts of sodium iodide. Evaporate the solvent in vacuo; dissolve the residue in ethylacetate and wash the ethylacetate solution with water and dilute sodium hydrogen carbonate (NaHCO$_3$) solution.

Dry the organic phase over sodium sulfate and then evaporate same in vacuo. Dissolve the obtained residue in 50 parts by volume of ethanol and 13 parts by volume of dioxane; add 17 parts of 2 N sodium hydroxide to the thus-produced solution and heat the resulting mixture for 2 hours at 60°. Neutralize the resultant solution with 17 parts of 2 N hydrochloric acid, and dilute with 100 parts of water to precipitate the title compound, M.P. 203° to 204°.

Example 40.—2-nitro-5,9,10,14b-tetrahydroisoquino[2,1-d][1,4]benzodiazepin-6(7H)-one

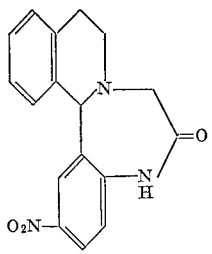

Heat the title compound of Example 39 at 205° for ½ hour. Crystallize the obtained amorphous residue from ethylacetate-diethylether to obtain the title compound as yellow prisms, M.P. 160° to 165°.

Example 41.—(±) - 2 - chloro - 5 - methyl - 5,9,10,14b-tetrahydroisoquino[2,1-d][1,4]benzodiazepin - 6(7H)-one-8-oxide

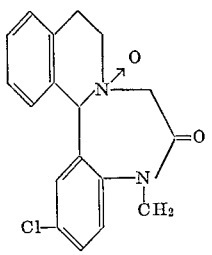

Dissolve 10 parts of racemic 2-chloro-5-methyl-5,9,10,14b - tetrahydroisoquino[2,1-d][1,4]benzodiazepin-6(7H)-one in 160 parts by volume of methylene chloride. To the resulting solution at 5° to 10° add within a period of 5 minutes and with stirring a solution of 12.2 parts of m-chloro-perbenzoic acid in 160 parts by volume of methylene chloride. Continue stirring for a further 5 to 10 minutes before extracting the obtained mixture with 1 N (aq.) ammonia. Separate to resulting organic phase, dry same over sodium sulfate, and evaporate to dryness in vacuo. Crystallize the residue from ethyl acetate to obtain 7.1 parts of title compound, M.P. 168° to 170°.

Replacing the racemic 2-chloro-5-methyl-5,9,10,14b-tetrahydroisoquino[2,1 - d][1,4]benzodiazepin - 6(7H)-one by an equivalent of either 2-bromo-5-ethyl-10-methyl-12,13 - dimethoxy - 5,9,10,14b - tetrahydroisoquino[2,1-d][1,4]benzodiazepin-6(7H) - one or 2 - nitro - 5 - methyl - 10 - ethyl - 13 - ethoxy - 5,9,10,14b - tetrahydroisoquino[2,1-d][1,4]benzodiazepin-6(7H)-one results in the preparation, in similar manner, of the corresponding N$_8$-oxide.

Example 42.—Racemic 2 - chloro - 5,9,10,14b - tetrahydroisoquino[2,1 - d][1,4]benzodiazepin - 6(7H)-one-8-oxide

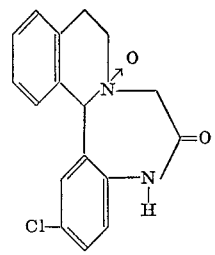

Dissolve 12 parts of racemic 2-chloro-5,9,10,14b-tetrahydroisoquino [2,1-d][1,4]benzodiazepin-6(7H)-one in 190 parts by volume of methylene chloride and 15 parts by volume of methanol. Cool the resulting clear solution to 10°, and add thereto (within a period of 5 minutes and under agitation) a solution of 15 parts of m-chloroperbenzoic acid in 190 parts by volume of methylene chloride. Continue stirring for 10 more minutes. Add to the thus-stirred material 500 parts by volume of dilute (aq.) ammonia. Shake the resultant to crystallize out the title compound. Filter off the crystals, and recrystallize from ethanol/water to obtain 9.6 parts of title compound, M.P. 201°.

Replacing the racemic 2-chloro-5,9,10,14b-tetrahydroisoquino-[2,1-d][1,4]benzodiazepin - 6(7H)-one by an equivalent of either racemic 2-trifluoromethyl-5-methyl-10-propyl - 12 - propoxy-5,9,10,14b-tetrahydroisoquino [2,1 - d][1,4]benzodiazepin-6(7H)-one or racemic 5-propyl - 10-methyl-12,13-methylenedioxy-5,9,10,14b-tetrahydroisoquino[2,1-d][1,4]benzodiazepin-6(7H)-one results in the preparation, in similar manner, of the corresponding N$_8$-oxide.

In order to prepare N$_8$-oxides wherein R$^5$ is lower alkyl, the corresponding compound I wherein R$^5$ is lower alkyl can be employed as a precursor in the same manner as illustrated in Example 41. A typical procedure for preparing compounds I wherein R$^5$ is lower alkyl is illustrated by Example 11.

Example 43

Mix 10 parts of the title compound of Example 30 (in the form of its free base) thoroughly with 10 parts of Tween 80 and 416 parts of propylene glycol. Add to the obtained mixture (with stirring) a solution consisting of 15 parts of tartaric acid dissolved in 200 parts by volume of water for injection. Adjust the resulting solution to pH 3.0 with 0.1 N (aq.) sodium hydroxide. Bring the obtained solution to 1000 parts by volume with water for injection, stir thoroughly, and filter through a millipore filter. Fill 1 milliliter ampuls with this solution under an atmosphere of carbon dioxide, seal the ampuls, and heat sterilize them at 121° for 15 minutes.

Ampul compositions of the type described in this example are administered either intramuscularly or intravenously according to established procedures.

dry the thus-treated organic phases over sodium sulfate; and evaporate the dried organic phases in vacuo.

Crystallize the residue by admixture with 75 parts by volume of a 1:1 mixture of benzene and pentane. Filter the precipitated crystals to obtain 1 part of (f), "cis" form, M.P. 111° to 113°.

(g) 1 - (2 - methylamino - 5 - chlorophenyl) - 2 - carboxymethyl-4-methyl-1,2,3,4-tetrahydroisoquinoline

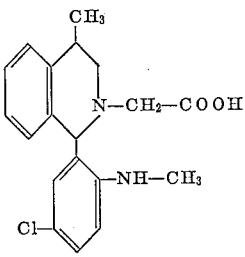

Dissolve 2 parts of (f), "cis" form, in 10 parts by volume of ethanol. Mix the obtained solution with 10 parts by volume of 1 N (aq.) sodium hydroxide. Reflux the resulting mixture for 1 hour. Cool the resultant to room temperature. Then admix same with 10 parts by volume of 1 N hydrochloric acid. Filter and dry precipitated crystals to obtain (g), "cis" form, M.P. 260° to 266°.

(h) 2 - chloro - 5,10 - dimethyl - 5,9,10,14b - tetrahydroisoquino[2,1-d][1,4]benzodiazepin-6(7H)-one

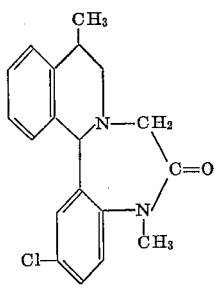

Dissolve 10 parts of (f), "trans" form, in a solution of 0.1 part of metallic sodium in 100 parts by volume of methoxy-ethanol. Reflux the resultant for 1 hour. Cool same to room temperature and evaporate the solvent therefrom in vacuo. Dissolve the crystalline residue in 150 parts by volume of methylene chloride, and extract the obtained solution twice with 50 parts by volume (each) of water. Dry the thus-washed product over sodium sulfate; evaporate the solvent to about 30 parts by volume. Add to the concentrate 100 parts by volume of diethylether. Filter the formed crystals and wash same with diethylether. There are thus obtained 7 parts of the "trans" form, M.P. 187° to 189°, of (h).

In the same manner the corresponding "cis" form, M.P. 179° to 181°, of (h) is obtained from the "cis" form of (f).

Example 45.—2-chloro-5,10,10-trimethyl-5,9,10,14b-tetrahydroisoquino[2,1-d][1,4]benzodiazepin-6(7H)-one

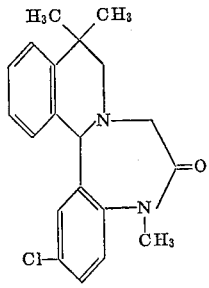

(a) N-(β,β-dimethylphenethyl)-5-chloro-2-methylaminobenzamide

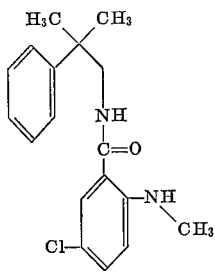

Dissolve 46.5 parts of β,β-dimethylphenethylamine in 250 parts by volume of dioxane, and add 63 parts of 6-chloro-N-methyl-isatoic anhydride thereto. Stir the resultant for 25 minutes at room temperature. Heat the thus-obtained reaction mixture for 30 minutes to 100°, cool thereafter and then dilute same with 500 parts by volume of water. Filter off the crystals; then dissolve them in methylene chloride, wash the obtained methylene chloride solution with water; dry the organic phase over sodium sulfate and evaporate the solvent in vacuo. Crystallize the residue with diethylether/pentane to obtaine (a), M.P. 126° to 127°.

(b) N-(β,β-dimethylphenethyl)-5-chloro-2 - tosylmethylaminobenzamide

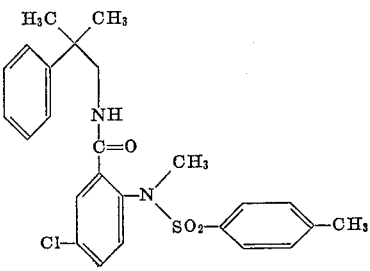

Dissolve 82.5 parts of (a) in 250 parts by volume of pyridine, and add thereto 99 parts of p-toluenesulfonyl chloride. Warm the obtained mixture on a waterbath (50° to 60°) for 6 hours. Thereafter add water to dissolve any pyridine hydrochloride. Concentrate the resulting solution in vacuo. Partition the residue between ethyl acetate and 2 N hydrochloric acid; wash the organic layer with 10% (aq.) sodium bicarbonate solution and with saturated sodium chloride solution; dry over sodium sulfate; and evaporate in vacuo. Recrystallize the crystalline residue with methylene chloride/diethylether to obtain (b), M.P. 128° to 130°.

(c) 1-(5-chloro-2-tosylmethylaminophenyl)-4,4-dimethyl-3,4-dihydroisoquinoline

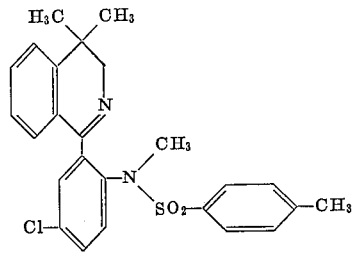

Dissolve 99 parts of (b) in 550 parts by volume of phosphorus oxychloride, and reflux the obtained mixture for 15 hours. Cool; evaporate in vacuo; dissolve the resulting residue in methylene chloride and then extract twice with ice cold 1 N (aq.) sodium hydroxide solution and with water. Dry the methylene chloride phase over sodium sulfate and evaporate in vacuo to dryness. Dissolve residue in acetone and saturate resulting solution with dry hydrogen chloride. Add diethylether to precipitate the hydrochloride of (c), M.P. 262° to 264°.

(d) 1-(5-chloro-2-methylaminophenyl)-4,4-dimethyl-3,4-dihydroisoquinoline

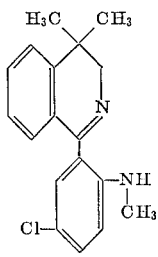

Add 6.8 parts of (c) to 15 parts by volume of concentrated sulfuric acid and leave the resulting mixture for 20 hours at room temperature. Then pour said mixture on 200 parts of ice and add slowly thereto 30% sodium hydroxide solution until the obtained solution is weakly basic. Extract resulting mixture three times with 75 parts by volume of methylene chloride; wash the combined organic phase twice with water; dry the obtained solution over sodium sulfate and evaporate the solvent in vacuo. Crystallize the residue by addition thereto of ethanol to obtain (d), M.P. 125° to 128°.

(e) 1-(5-chloro-2-methylaminophenyl)-4,4-dimethyl-1,2,3,4-tetrahydroisoquinoline

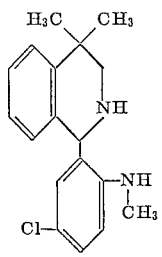

Dissolve 50 parts of 1-(5-chloro-2-methylaminophenyl)-4,4-dimethyl-3,4-dihydroisoquinoline in 500 parts by volume of 95% ethanol and add thereto 5 parts of sodium borohydride. Reflux the thus-obtained mixture for 6 hours; cool; acidify with 2 N hydrochloric acid and evaporate most of the ethanol in vacuo. Add to the concentrate sufficient (aq.) sodium hydroxide solution to render said concentrate alkaline before extracting same twice with ethyl acetate; wash the organic phase with water and dry same over sodium sulfate. Evaporate the solvent in vacuo and crystallize the residue from diethylether/pentane to obtain (e), M.P. 110° to 112°.

(f) 1-(5-chloro-2-methylaminophenyl)-2-carbomethoxymethyl-4-,4-dimethyl-1,2,3,4-tetrahydroisoquinoline

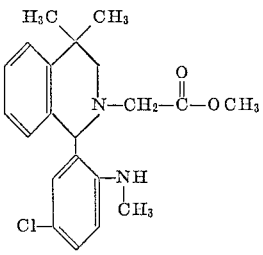

Admix 10 parts of 1-(5-chloro-2-methylaminophenyl)-4,4-dimethyl-1,2,3,4-tetrahydroisoquinoline, 7 parts of triethylamine and 10 parts of methyl bromoacetate in 90 parts by volume of ethanol and reflux the obtained admixture for 4 hours. Evaporate the solvent in vacuo; dissolve the residue in ethylacetate, wash the organic solution with water; dry same over sodium sulfate and then evaporate in vacuo. Filter the thus-obtained crude product through silica gel (benzene-pentane 1:1 as solvent) to obtain (f), M.P. 111° to 113°.

(g) 1-(5-chloro-2-methylaminophenyl)-2-carboxymethyl-4,4-dimethyl-1,2,3,4-tetrahydroisoquinoline

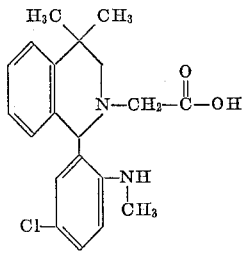

Heat a mixture of 2 parts of (f), 10 parts by volume of ethanol and 10 parts by volume of 1 N (aq.) sodium hydroxide solution to reflux for one and one half hours. Then add thereto 10 parts by volume of 1 N (aq.) hydrogen chloride solution and collect the crystals which are formed. Recrystallize from ethanol/water to obtain (g), M.P. 212° to 216°.

(h) Heat 1 part of (g) for 40 minutes to 205°; then cool same to room temperature. Add to the thus-cooled material 5 parts by volume of methylene chloride to dissolve any solids and then 10 parts by volume of diethylether. Store the resulting solution at 0° overnight and collect the crystals of the title compound, M.P. 190° to 194°, which are thus formed.

Example 46.—5-methyl-2-trifluoromethyl-5,9,10,14b-tetrahydroisoquino[2,1-d][1,4]benzodiazepin - 6(7H) - one hydrochloride

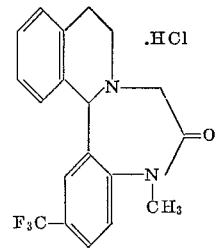

(a) 1-(2-chloro-5-trifluoromethyl-phenyl)-3,4-dihydroisoquinoline hydrochloride

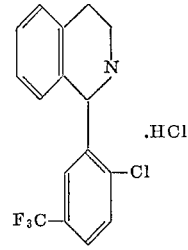

Reflux for 5 hours in 8 parts by volume of stannic chloride a solution of 10 parts of phenethylchloride and 13 parts of 2-chloro-5-trifluoromethyl-benzonitrile. Add with intense cooling (Dry Ice/acetone) to the cooled mixture 25% sodium hydroxide solution until the mixture is alkaline. Extract the very cloudy solution three times with ethylacetate. Filter the organic phase; wash same with water and saturated sodium chloride solution; dry over sodium sulfate and evaporate in vacuo. Dissolve the residue in methylene chloride and saturate with dry hydrogen chloride gas. Addition thereto of diethylether and cooling to 0° yields 7.5 parts of crystalline (a), M.P. 212° to 214°. The compound may be purified by sublimation at 100° and 0.5 mm. pressure.

Replacing the phenethylchloride with an equivalent of either m-(β-chloroethyl)toluene, p-ethoxyphenethylchloride or 1-(β-chloroethyl)-3,4-methylenedioxybenzene results in the preparation, in similar manner, of the hydrochloride of the corresponding compound XV.

Replacing the 2 - chloro - 5 - trifluoromethylbenzonitrile with an equivalent of either 2,5-dichlorobenzonitrile, 2- bromo-5-nitrobenzonitrile or 2-chloro-5-fluorobenzonitrile results in the preparation, in similar manner, of the hydrochloride of the corresponding compound XV.

(b) 1-(2-methylamino-5-trifluoromethyl-phenyl)-3,4-dihydroisoquinoline

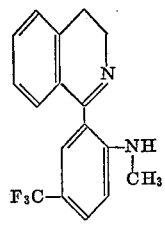

Heat to 55° to 60° (autoclave) in 500 parts by volume of liquid methylamine a mixture of 35 parts of 1-(2-chloro - 5 - trifluoromethyl - phenyl) - 3,4 - dihydroisoquinoline hydrochloride, 1.7 parts of cuprous chloride and 1.7 parts of copper powder; maintain the resultant at 55° to 60° for 12 hours. Cool the resultant and evaporate the methylamine at room temperature. Treat the thus-obtained residue with 500 parts by volume of methylene chloride; filter off insoluble material. Wash the organic phase twice with water; dry over sodium sulfate and evaporate in vacuo to obtain 32 parts of light yellow oil, (b).

Replacing the methylamine with an equivalent of either ethylamine or benzylamine results in the preparation, in similar manner, of the corresponding compound XVII. To obtain compounds XVII wherein R° is a hydrogen atom, liquid ammonia is employed under the same conditions.

Replacing (a) with either 1-(2-bromo-5-trifluoromethyl-phenyl)-6-methoxy-3,4-dihydroisoquinoline hydrochloride, 1 - (2,5 - dichlorophenyl)- 7 - methyl - 3,4 - dihydroisoquinoline hydrochloride or either of the corresponding free bases, results in the preparation, in similar manner, of the corresponding compound XVII.

(c) 1 - (2 - methylamino - 5 - trifluoromethyl - phenyl) - 1,2,3,4-tetrahydroisoquinoline

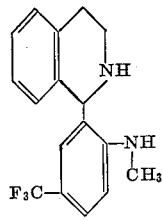

Reflux for two hours in 400 parts by volume of 95% ethanol a mixture of 30 parts of 1-(2-methylamino-5-trifluoromethyl-phenyl)-3,4-dihydroisoquinoline and 8 parts of sodium borohydride. Cool the obtained solution and treat same with 2 N hydrochloric acid to destroy excess sodium borohydride. Alkalize the resultant with 2 N sodium hydroxide solution and distill off the solvent in vacuo until 100 parts by volume remain. Extract the resultant mixture three times with ethylacetate. Wash the organic phase twice with saturated sodium chloride solution; dry same over sodium sulfate and evaporate in vacuo to obtain 12 parts of (c), M.P. 125° to 129°, crystallized from ethanol.

(d) 1 - (2 - methylamino - 5 - trifluoromethyl - phenyl) - 2-carbethoxymethyl-1,2,3,4-tetrahydroisoquinoline

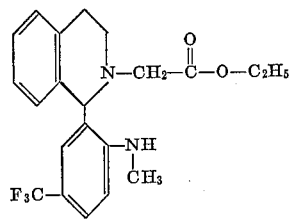

Reflux for five hours in 30 parts by volume of ethanol a mixture of 1 part of 1-(2-methylamino-5-trifluoromethyl-phenyl)-1,2,3,4-tetrahydroisoquinoline, 1 part of ethylbromoacetate and 0.7 part of triethylamine. Evaporate the solvent in vacuo; dissolve the residue in methylene chloride; wash the solution with water; dry same over sodium sulfate and evaporate in vacuo. Distill the oily residue at 130° and 0.5 mm. pressure and crystallize the distillate from pentane to obtain 1.1 parts of (d), M.P. 80° to 82°.

(e) Add to a solution of 0.1 part of metallic sodium in 200 parts by volume of absolute 2-methoxy-ethanol 10 parts of 1 - (2-methylamino-5-trifluoromethyl-phenyl)-2-carbethoxymethyl - 1,2,3,4 - tetrahydroisoquinoline and reflux for one hour. Distill the solvent off in vacuo and dissolve the residue in methylene chloride. Wash the organic phase twice with water; dry over sodium sulfate and evaporate in vacuo to obtain 9.5 parts of a light brown oil. Dissolve the oil in ethylacetate and saturate the solution with dry hydrogen chloride gas. The hydrochloride (title compound) precipitates on cooling and melts at 221° to 225°.

It is thought that the invention and its advantages will be understood from the foregoing description. Various changes may be made in the intermediates and the final products (including the pharmaceutically acceptable acid addition salts of compounds I) without departing from the spirit and scope of the invention or sacrificing its material advantages. The starting materials, intermediates, free bases and acid addition salts set forth hereinabove are merely illustrative embodiments.

What is claimed is:

1. A member selected from the group consisting of a 2 - X - 5 - $R^5$ - 10 - $R^3$ - 10 - $R^4$ - 12 - $R^2$ - 13-$R^1$-5,9,10,14b-tetrahydroisoquino[2,1 - d][1,4]benzodiazepin - 6(7H) - one, a pharmaceutically acceptable acid addition salt thereof and an $N_8$-oxide thereof, and wherein
    X is a member selected from the group consisting of a hydrogen atom, halo, nitro, primary amino and trifluoromethyl;
    each of $R^1$ and $R^2$ is, independently, a member selected from the group consisting of a hydrogen atom, halo, lower alkyl and lower alkoxy or, taken together, methylenedioxy;
    each of $R^3$ and $R^4$ is a member selected from the group consisting of a hydrogen atom and lower alkyl; and
    $R^5$ is a member selected from the group consisting of a hydrogen atom, lower alkyl, allyl and propargyl.

2. A compound according to claim 1 which is a member selected from the group consisting of a 5,9,10,14b-tetrahydroisoquino[2,1 - d][1,4]benzodiazepin-6(7H) - one and a pharmaceutically acceptable acid addition salt thereof, and wherein
    X is a member selected from the group consisting of a hydrogen atom, chloro, bromo, nitro, primary amino and trifluoromethyl; and
    each of $R^1$ and $R^2$ is, independently, a member selected from the group consisting of a hydrogen atom, chloro, bromo, lower alkyl and lower alkoxy.

3. The compound according to claim 2 which is 5,9,10, 14b - tetrahydroisoquino[2,1-d][1,4]benzodiazepin - 6-(7H)-one.

4. The compound according to claim 2 which is 2-chloro-5,10 - dimethyl-5,9,10,14b - tetrahydroisoquino-[2,1-d][1,4]benzodiazepin-6(7H)-one.

5. The compound according to claim 2 which is 2-chloro - 5,9,10,14b - tetrahydroisoquino[2,1-d][1,4]benzodiazepin-6(7H)-one.

6. The compound according to claim 2 which is 2-chloro - 5-ethyl - 5,9,10,14b - tetrahydroisoquino[2,1-d] [1,4]benzodiazepin-6(7H)-one.

7. The compound according to claim 2 which is (+)-2-chloro-5-methyl-5,9,10,14b - tetrahydroisoquino[2,1-d] [1,4]benzodiazepin-6(7H)-one.

8. The compound according to claim 2 which is 2-chloro-5-methyl - 5,9,10,14b - tetrahydroisoquino[2,1-d] [1,4]benzodiazepin-6(7H)-one.

9. The compound according to claim 2 which is 2-chloro - 5-methyl - 12,13-dimethoxy-5,9,10,14b-tetrahydroisoquino[2,1-d][1,4]benzodiabepin-6(7H)-one.

10. The compound according to claim 2 which is 2-chloro-5,10,10-trimethyl - 5,9,10,14b - tetrahydroisoquino[2,1-d][1,4]benzodiazepin-6(7H)-one.

11. The compound according to claim 2 which is 2-chloro-5,10 - dimethyl - 5,9,10,14b - tetrahydroisoquino[2,1-d][1,4]benzodiazepin-6(7H)-one.

12. A compound according to claim 2 which is of the formula

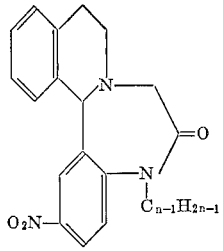

wherein $n$ is a positive whole number from 1 to 5, inclusive.

13. The compound according to claim 2 which is 2-nitro - 5-methyl - 5,9,10,14b - tetrahydroisoquino[2,1-d][1,4]benzodiazepin-6(7H)-one.

14. The compound according to claim 2 which is 2-nitro - 5,9,10,14b - tetrahydroisoquino[2,1-d][1,4]benzodiazepin-6(7H)-one.

15. An $N_8$-oxide according to claim 1 wherein
X is a member selected from the group consisting of a hydrogen atom, halo, nitro and trifluoromethyl;
each of $R^1$ and $R^2$ is a member selected from the group consisting of a hydrogen atom, methoxy and, taken together, methylenedioxy;
each of $R^3$ and $R^4$ is a member selected from the group consisting of a hydrogen atom and lower alkyl; and
$R^5$ is a member selected from the group consisting of hydrogen and lower alkyl.

16. The compound according to claim 15 which is 5,10 - dimethyl-12,13-methylenedioxy - 5,9,10,14b - tetrahydroisoquino[2,1-d][1,4]benzodiazepin - 6(7H) - one-8-oxide.

17. A compound according to claim 1 which is of the formula

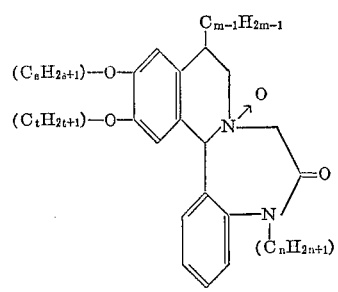

wherein
each of $n$, $s$ and $t$ is, independently, one of the integers 1, 2, 3 and 4; and
$m$ is an integer from 1 to 5, inclusive.

18. A compound according to claim 1 which is of the formula

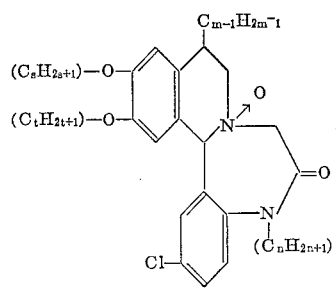

wherein
each of $n$, $s$ and $t$ is, independently, one of the integers 1, 2, 3 and 4; and
$m$ is an integer from 1 to 5, inclusive.

19. The compound according to claim 15 which is (+)-2-chloro-5-methyl - 5,9,10,14b - tetrahydroisoquino[2,1-d)][1,4]benzodiazepin-6(7H)-one-8-oxide.

20. A compound according to claim 1 which is of the formula

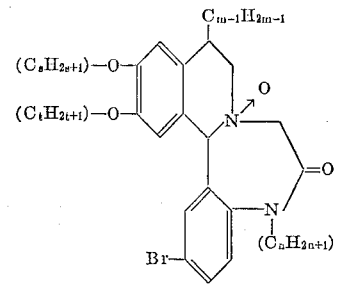

wherein
each of $n$, $s$ and $t$ is, independently, one of the integers 1, 2, 3 and 4; and
$m$ is an integer from 1 to 5, inclusive.

21. The compound according to claim 20 which is 2-bromo - 5-ethyl - 10-methyl-12,13 - dimethoxy-5,9,10,-14b - tetrahydroisoquino[2,1 -d][1,4]benzodiazepin - 6-(7H)-one-8-oxide.

22. A compound according to claim 1 which is

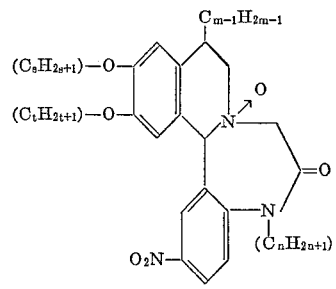

wherein
each of $n$, $s$ and $t$ is, independently, one of the integers 1, 2, 3 and 4; and
$m$ is an integer from 1 to 5, inclusive.

23. The compound according to claim 1 which is 2-nitro-5-methyl - 10-ethyl - 13-ethoxy-5,9,10,14b-tetrahydroisoquino[2,1-d][1,4[benzodiazepin - 6(7H) - one - 8-oxide.

24. A compound according to claim 1 of the formula

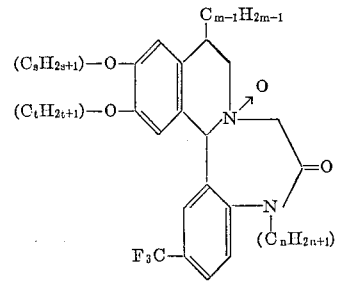

wherein
each of $n$, $s$ and $t$ is, independently, one of the integers 1, 2, 3 and 4; and
$m$ is an integer from 1 to 5, inclusive.

25. The compound according to claim 1 which is 2-trifluoromethyl-5-methyl - 10-propyl - 12-propoxy-5,9,10,14b - tetrahydroisoquino[2,1 - d][1,4]benzodiazepin - 6(7H)-one-8-oxide.

26. A compound according to claim 1 which is of the formula

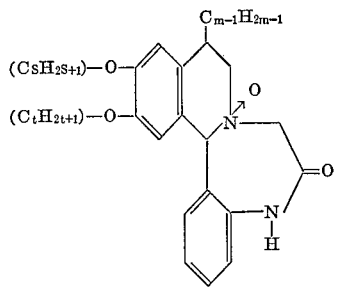

wherein
each of s and t is, independently, one of the integers 1, 2, 3 and 4; and
m is an integer of from 1 to 5, inclusive.

27. A compound according to claim 1 which is of the formula

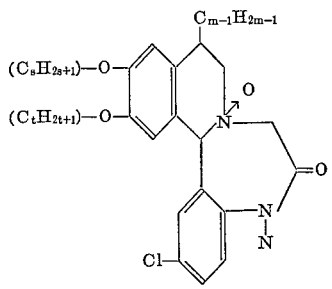

wherein
each of s and t is, independently, one of the integers 1, 2, 3 and 4; and
m is an integer from 1 to 5, inclusive.

28. The compound according to claim 1 which is racemic 2 - chloro-5,9,10,14b - tetrahydroisoquino[2,1-d][1,4]benzodiazepin-6(7H)-one-8-oxide.

29. A compound according to claim 1 which is of the formula

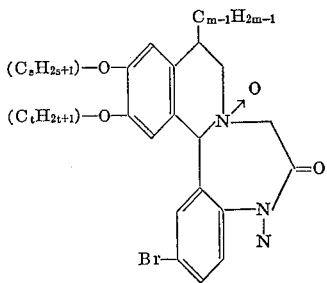

wherein
each of s and t is, independently, one of the integers 1, 2, 3 and 4; and
m is an integer from 1 to 5, inclusive.

30. A compound according to claim 1 which is of the formula

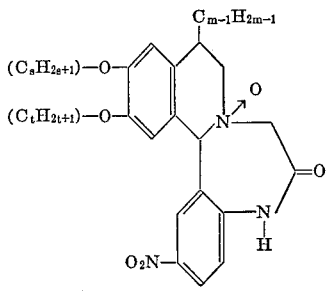

wherein
each of s and t is, independently, one of the integers 1, 2, 3 and 4; and
m is an integer from 1 to 5, inclusive.

31. A compound according to claim 1 which is of the formula

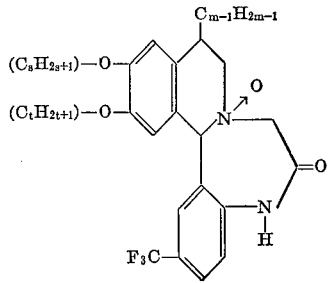

wherein
each of s and t is, independently, one of the integers 1, 2, 3 and 4; and
m is an integer from 1 to 5, inclusive.

32. The compound according to claim 1 which is (+)-2-chloro-5-methyl - 5,9,10,14b-tetrahydroisoquino[2,1-d][1,4]benzodiazepin-6(7H)-one-8-oxide.

33. The compound according to claim 1 which is (−) 2-chloro - 5-methyl-5,9,10,14b-tetrahydroisoquino[2,1-d][1,4]benzodiazepin-6(7H)-one-8-oxide.

34. A compound according to claim 2 wherein X is trifluoromethyl.

35. The compound according to claim 34 which is 5-methyl-2-trifluoromethyl-5,9,10,14b - tetrahydroisoquino[2,1-d][1,4]benzodiazepin-6(7H)-one.

36. A compound according to claim 1 wherein each of $R^3$ and $R^4$ is, independently, a lower alkyl.

References Cited

UNITED STATES PATENTS 3,084,155   4/1963   Winthrop et al. ____ 260—239.3

HENRY R. JILES, *Primary Examiner.*

R. T. BOND, *Assistant Examiner.*

U.S. Cl. X.R.

260—283, 287, 288; 424—258